(12) United States Patent
Jadaud et al.

(10) Patent No.: US 6,874,969 B2
(45) Date of Patent: Apr. 5, 2005

(54) TRUCKING ANGLE ACCESSORY

(75) Inventors: Alain Jadaud, Tennie (FR); Bertrand Decore, La Chapelle Saint Aubin (FR)

(73) Assignees: Legrand, Limoges (FR); Legrand SNC, Limoges (FR)

( * ) Notice: Subject to any disclaimer, the term of this patent is extended or adjusted under 35 U.S.C. 154(b) by 0 days.

(21) Appl. No.: 10/158,140

(22) Filed: May 31, 2002

(65) Prior Publication Data

US 2003/0223810 A1 Dec. 4, 2003

(30) Foreign Application Priority Data

Jun. 1, 2001 (FR) .............................. 01 07253

(51) Int. Cl.⁷ .......................... H02G 3/10; F16C 11/00
(52) U.S. Cl. ....................... 403/92; 403/403; 52/220.7; 174/48; 385/135
(58) Field of Search ................................ 385/134, 135; 403/83, 84, 85, 93, 96, 97, 403, 382; 52/220.2; 174/48

(56) References Cited

U.S. PATENT DOCUMENTS

| | | | | | |
|---|---|---|---|---|---|
| 917,328 | A | * | 4/1909 | Lutz ........................ | 285/154.1 |
| 3,351,699 | A | * | 11/1967 | Merckle ................ | 174/35 GC |
| 3,782,420 | A | * | 1/1974 | Kolb et al. ................. | 138/156 |
| 4,704,838 | A | * | 11/1987 | Wendt ......................... | 52/658 |
| 5,161,580 | A | * | 11/1992 | Klug ............................ | 138/92 |
| 5,469,893 | A | * | 11/1995 | Caveney et al. ............ | 138/162 |
| 5,470,021 | A | * | 11/1995 | Looney ....................... | 248/49 |
| 5,476,327 | A | * | 12/1995 | Chiang ........................ | 384/545 |
| 5,917,982 | A | * | 6/1999 | Vargas et al. ............... | 385/134 |
| 5,929,380 | A | * | 7/1999 | Carlson et al. ............ | 174/68.3 |
| 5,995,699 | A | * | 11/1999 | Vargas et al. ............... | 385/134 |
| 6,002,087 | A | * | 12/1999 | Albert et al. ................. | 174/48 |
| 6,156,977 | A | * | 12/2000 | Benito-Navazo ............ | 174/97 |
| 6,188,024 | B1 | * | 2/2001 | Benito-Navazo ............ | 174/97 |
| 6,323,421 | B1 | * | 11/2001 | Pawson et al. ............... | 174/48 |
| 6,344,611 | B2 | * | 2/2002 | Ewer et al. ................... | 174/48 |
| 6,478,499 | B1 | * | 11/2002 | Fugman et al. .............. | 403/82 |
| 6,522,824 | B2 | * | 2/2003 | Dagley et al. .............. | 385/134 |
| 6,599,056 | B1 | * | 7/2003 | Piole et al. ................. | 403/382 |

FOREIGN PATENT DOCUMENTS

| | | |
|---|---|---|
| DE | 41 20 937 A1 | 3/1992 |
| EP | 0 734 107 A1 | 9/1996 |
| FR | 2 727 578 | 5/1996 |
| GB | 685 964 | 1/1953 |
| GB | 1 050 742 | 12/1966 |
| GB | 2 315 924 A | 2/1998 |

* cited by examiner

*Primary Examiner*—Thomas B. Will
*Assistant Examiner*—Thomas A. Beach
(74) *Attorney, Agent, or Firm*—Young & Thompson

(57) ABSTRACT

A trunking angle accessory for establishing continuity between two differently oriented lengths of trucking each including a base section having two lateral flanges with rims that are directed toward each other and include elements for fitting a length of cover section comprises two cheeks each adapted to establish a continuous wall between two lateral flanges of the two base sections. Each cheek carries a strip for establishing a continuous wall between the rims of two lateral flanges of the two base sections. The band of each cheek includes elements for fitting a length of cover section which extend along a circular arc of given radius of curvature.

66 Claims, 11 Drawing Sheets

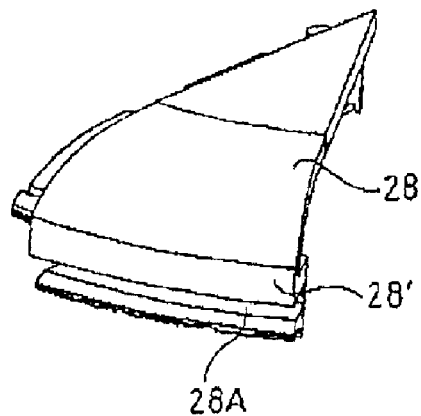
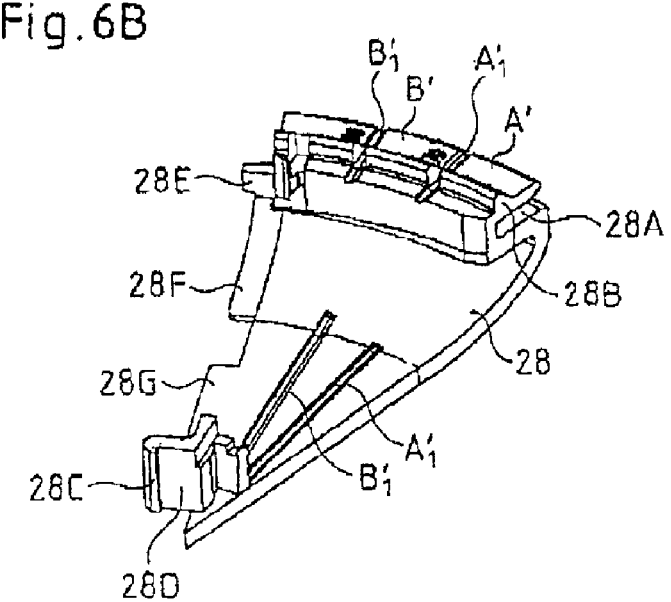

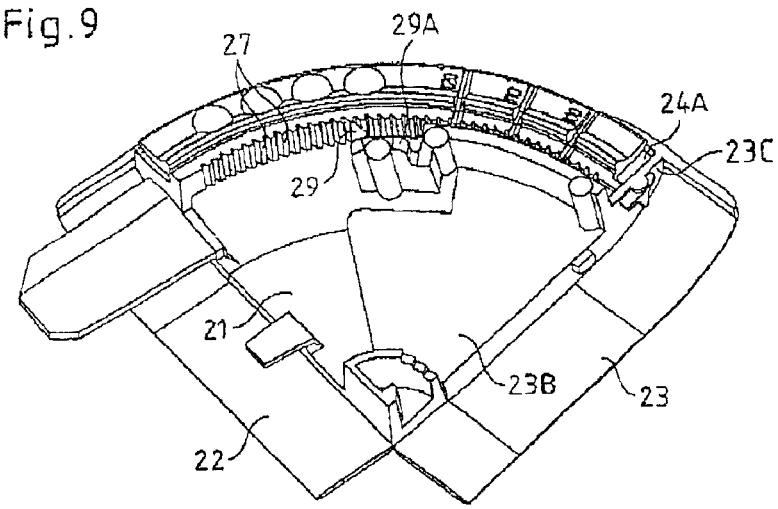
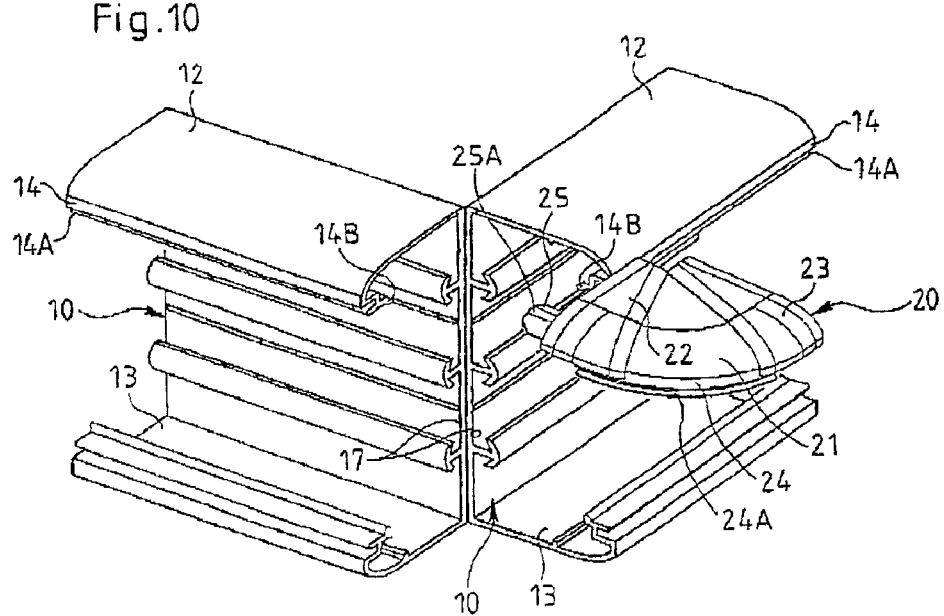

TRUCKING ANGLE ACCESSORY

BACKGROUND OF THE INVENTION

1. Field of the Invention

The present invention relates generally to trunking of the kind used to support, house and protect diverse devices, for example, and in particular diverse electrical devices, and to support, house and protect conductors or pipes connected to the devices.

2. Description of the Prior Art

The invention relates more particularly to a trunking angle accessory for establishing continuity between two differently oriented lengths of trunking each including a base section having two lateral flanges with rims that are directed toward each other and include means for fitting a length of cover section, the angle accessory comprising two cheeks each adapted to establish a continuous wall between two lateral flanges of the two base sections, and each cheek carrying a strip providing a continuous wall between the rims of two lateral flanges of the two base sections.

The angle accessory is generally used to make the connection between two ends of lengths of trunking which are cut at 90° and which are in contact only along a line where the backs of the base sections meet at the corner, leaving a gap that the angle accessory fills in.

This kind of angle accessory is disclosed in the document EP 0 734 107.

According to that document, the bands of the cheeks of the angle accessory include means for fitting a dedicated cover member adapted to close the angle accessory and covering the cut ends of lengths of cover section clipped onto the base sections of the lengths of trunking to be joined.

This kind of angle accessory is relatively unattractive because it projects in front of the base sections, since its cover member must cover the cut ends of the lengths of cover section clipped to the base sections.

The document DE 41 20 937 discloses an angle accessory of the same kind as that described in the document EP 0 734 107 and which includes two cheeks adapted to establish continuity between the lateral flanges of the base sections of the lengths of trunking to be connected and a dedicated cover member to be fixed to the two cheeks to close the angle formed between the base sections.

According to the above document, each end edge of the dedicated cover member is pressed against a cut end edge of a length of cover section closing each base section, forming a visible edge at the junction of the two end edges.

The document GB 2 315 924 discloses an angle accessory including, on the one hand, an end part establishing continuity between the lateral flanges of the base sections of the lengths of trunking to be connected and including, in one piece with it, a member for closing the angle formed between the base sections covering the cut edges of the lengths of cover section closing the end base sections, and, on the other hand, a junction member between internal partitions of the base sections and a dedicated closure member which clips onto the junction member and covers the cut end edges of the lengths of cover section closing said base sections.

Finally, the document GB 1 050 742 discloses a trunking angle accessory adapted to establish continuity between two differently oriented mitered lengths of trunking and including a plate and two cheeks each adapted to establish a continuous wall between two lateral flanges of the two base sections, the cheeks carrying a strip establishing a continuous wall between the right-angle rims of the lateral flanges of the base sections.

Here, the cover sections for closing the base sections of the lengths of trunking are not fixed by clipping them on, and the bands of the cheeks of the angle accessory form an acute angle such that the angle formed between the two base sections is closed by two lengths of closure cover section that form a visible edge or a crease at their junction, which is not particularly attractive either.

To eliminate the drawbacks previously cited, the present invention proposes a new trunking angle accessory adapted to establish continuity between two differently oriented lengths of trunking and which also enables a continuous closure cover section to span the gap between the two base sections.

SUMMARY OF THE INVENTION

The invention provides a trunking angle accessory for establishing continuity between two differently oriented lengths of trunking each including a base section having two lateral flanges with rims that are directed toward each other and include means for fitting a length of cover section, the angle accessory comprising two cheeks each adapted to establish a continuous wall between two lateral flanges of the two base sections, and each cheek carrying a strip for establishing a continuous wall between the rims of two lateral flanges of the two base sections, wherein the band of each cheek includes means for fitting a length of cover section which extend along a circular arc of given radius of curvature, whereby a single length of the cover section adapted to close the base sections can be fitted to the cheeks to close a portion of the base sections and the angle formed between the base sections with no gap or visible edge or crease in the angle.

Other non-limiting and advantageous features of the angle accessory according to the invention include:

it further includes another cheek adapted to establish a continuous wall between two divider partitions attached to backs of the two base sections and carrying a band for establishing a continuous wall between rims of the divider partitions, in which lengths of cover section for closing compartments of the base sections are mounted, the band including means for fitting the lengths of cover section extending along a given radius of curvature, so that a single length of cover section adapted to close the compartments of the base sections can be fitted to the cheeks to close a part of each pair of butt-jointed compartments of the base sections and the angle formed between the base sections with no gap or visible edge or crease in the angle;

the means on the bands of the cheeks for fitting a length of cover section are substantially identical to the means for fitting a length of cover section on the rims of the lateral flanges or the divider partitions of the base sections;

the means on the bands of the cheeks for fitting a length of cover section include engagement means for engaging the length of cover section. The engagement means of each cheek include, for example, a groove adapted to establish a continuous groove between the grooves on the rims of the lateral flanges or the divider partitions of the base sections;

the means on the strips of the cheeks for fitting a length of cover section include clipping means for clipping the length of cover section. The clipping means of each cheek include, for example, a clipping bead adapted to establish a continuous clipping bead between the clipping beads provided on the rims of the lateral flanges or the divider partitions of the base sections;

the radius of curvature is from approximately 35 mm to approximately 80 mm or from approximately 35 mm to approximately 40 mm;

each cheek includes a base member having an end part adapted to engage over a lateral flange or over a divider partition of one of the base sections to cover its cut edge and an end member adapted to engage over a lateral flange or over a divider partition of the other of the base sections to cover its cut edge, the end member and the base member being adapted to pivot on each other so that they can be placed in different relative angular positions;

releasable immobilizing means on the base member and on the end member cooperate with each other to immobilize the end member and the base member in an angular position relative to each other in a releasable manner;

the base member has at least one part that can be cut off opposite its end part;

each cheek includes a supplementary member adapted to be fixedly attached to the base member opposite its end part to form a single member to which the end member is pivoted. Each additional member can be nested over the base member and hooked onto the base member; and each supplementary member includes a part which can be cut off extending over an angular sector.

The following description with reference to the accompanying drawings, provided by way of non-limiting example, explains in what the invention consists and how it can be put into effect.

BRIEF DESCRIPTION OF THE DRAWINGS

FIG. 6A is a perspective view of an additional member adapted to be attached to the base member of one cheek of the angle accessory shown in FIG. 1.

FIG. 6B is a bottom view of the additional member shown in FIG. 6A.

FIGS. 9 and 10 show two successive steps of fitting a cheek of the angle accessory shown in FIG. 1 to the lateral flanges of the base sections of butt-jointed lengths of trunking.

DETAILED DESCRIPTION OF THE PREFERRED EMBODIMENTS

Figure 1:
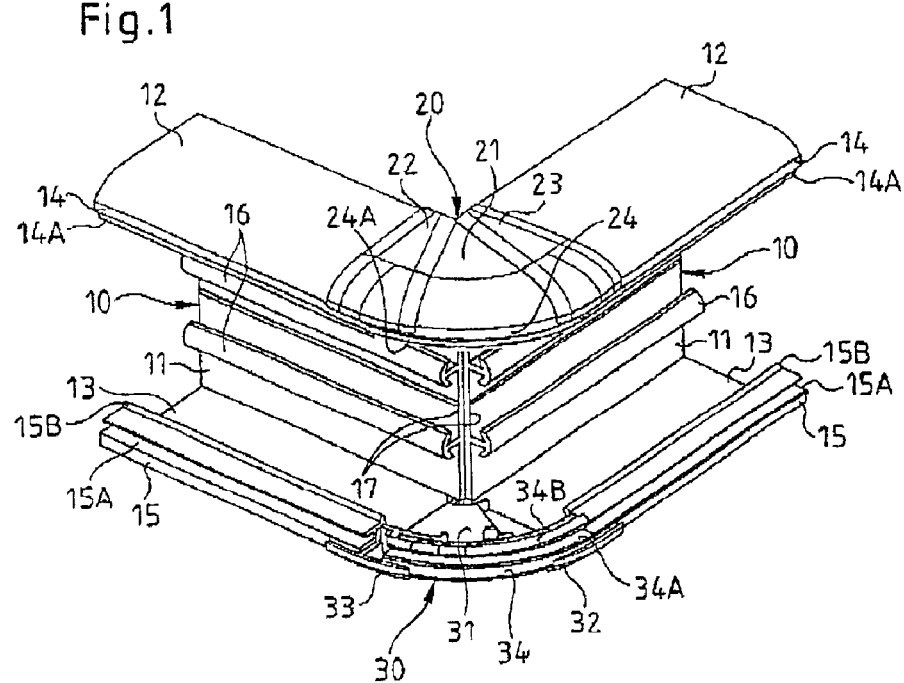
FIG. 1 is a perspective view of one embodiment of an angle accessory according to the invention attached to base sections of two lengths of trunking.

FIG. 1 shows an angle accessory used to connect two lengths of trunking cut and laid end-to-end to form an external angle.

The two lengths of trunking are identical and each essentially comprises a U-section base section 10 which has two lateral flanges 12, 13 upstanding perpendicularly from the back of the base section with rims 14, 15 that are directed toward each other and include means for fitting a length of cover section 40 (see FIG. 2) for closing the base section 10.

The rims 14, 15 are at a right angle to the lateral flanges 12, 13.

Of course, the base section can have any other cross section, for example a V-section with divergent lateral flanges carrying at the top rims directed toward each other.

The base sections 10 are preferably molded from a plastics material.

The means on each rim 14, 15 for fitting the length of cover section 40 include engagement means comprising a groove 14A, 15A and, outside each groove 14A, 15A, near its bottom, a clipping bead 14B, 15B (see FIGS. 1 and 10), each clipping bead 14B, 15B running along each groove 14A, 15A.

In corresponding relationship, each length of cover section 40 includes, in the vicinity of each of its longitudinal edges 41, 42, a series of engagement tongues 43. Each series of engagement tongues 43 extends along each longitudinal edge 41, 42 and each engagement tongue 43 is perpendicular to the plane of the length of cover section 40.

Each series of engagement tongues 43 is adapted to engage in each groove 14A, 15A formed at the edge of each rim 14, 15 of each lateral flange 12, 13 of each base section 10.

Furthermore, the length of closure cover section 40 includes a series of clipping tongues 44 on the inside of each series of engagement tongues 43, and in the vicinity thereof. Each series of clipping tongues 44 is parallel to each series of engagement tongues 43 and each clipping tongue 44 is perpendicular to the plane of the length of cover section 40.

Each clipping tongue 44 has a clipping tooth at its free end.

Each series of clipping tongues 44 is adapted to hook over each corresponding clipping bead 14B, 15B of each lateral flange 12, 13 of a base section 10.

The length of cover section 40 shown in FIG. 2 has some flexibility to adapt to a configuration of clipping bead and groove following a curved path with a particular radius of curvature, as explained in detail later.

The length of cover section is also advantageously made from plastics material.

The length of cover section 40 is advantageously obtained from a length conventional of cover section which has a longitudinal engagement tongue and a longitudinal clipping tongue in the vicinity of each longitudinal edge, and both of which are continuous. Each continuous longitudinal engagement and clipping tongue of the length of conventional cover section is cut into a series of engagement tongues and a series of clipping tongues to make the length of cover section 40 highly flexible, without weakening it.

The angle accessory shown in FIG. 1 includes two cheeks 20, 30 each adapted to establish a continuous wall between the lateral flanges 12 of the two base sections 10 butt-jointed and mitered at their end edge 17.

Each cheek 20, 30 carries a band 24, 34 providing a continuous wall between the rims 14, 15 of the lateral flanges 12, 13 of the base sections 10.

Figure 11:
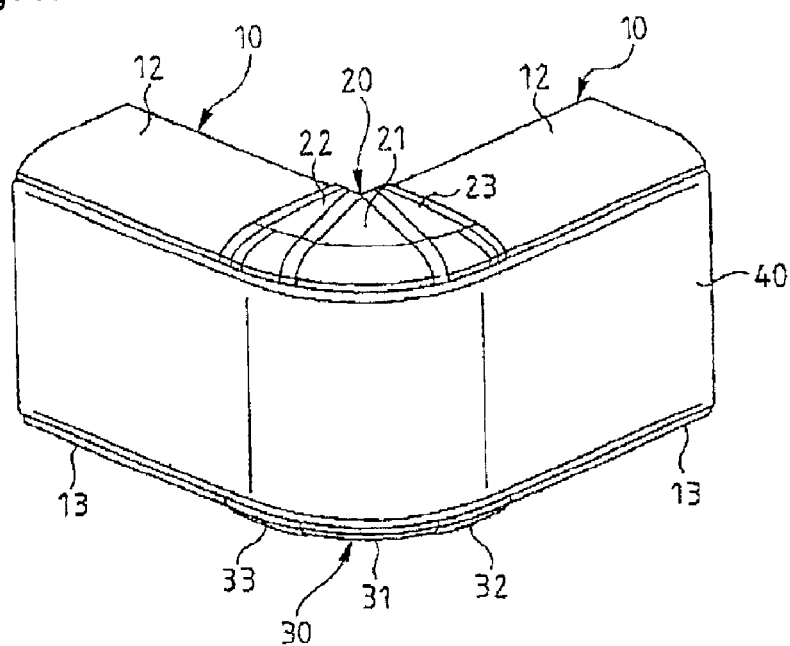
FIG. 11 is a perspective view of the base sections shown in FIG. 1 connected by the angle accessory according to the invention and closed by the same length of cover section.
Figure 12:
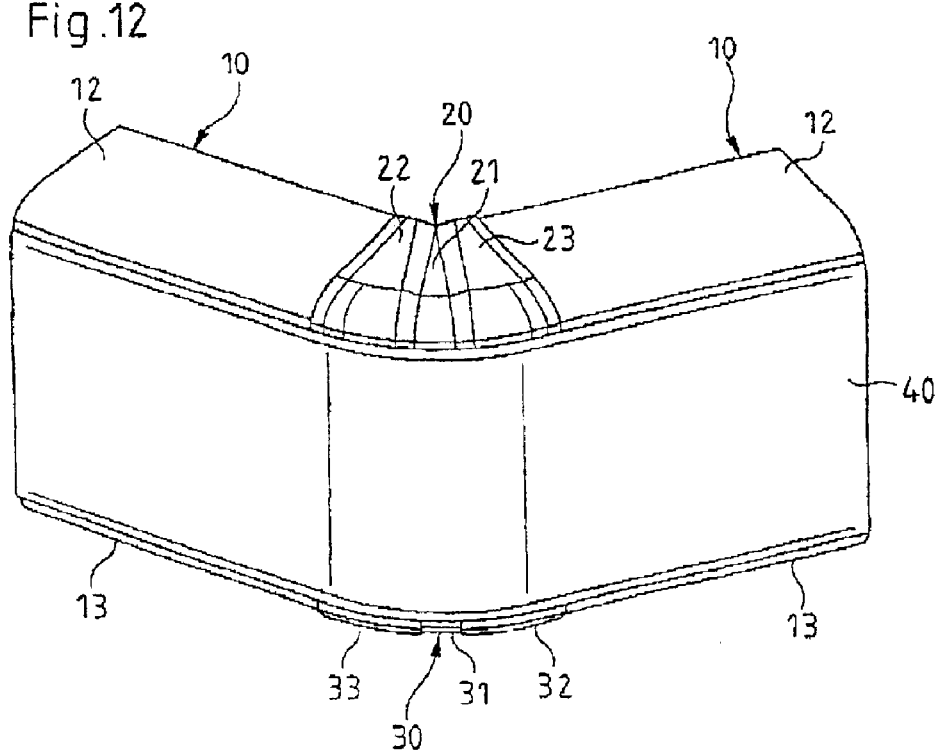
FIG. 12 shows two base sections of lengths of trunking positioned relative to each other to form an external angle of approximately 120° and incorporating the angle accessory according to the invention, the whole being closed by the same length of closure cover section.
Figure 14:
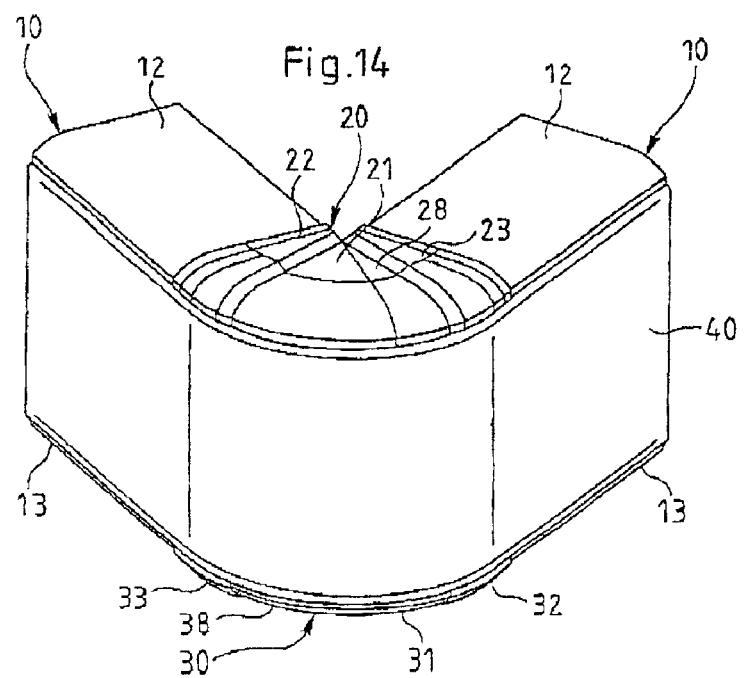
FIG. 14 shows base sections of two lengths of trunking butt-jointed to form an external angle of approximately 60° and incorporating a different embodiment of an angle accessory according to the invention.

The band 24, 34 of each cheek 20, 30 includes means for fitting a length of cover section that extend along a circular arc with a given radius of curvature, so that a single length of the cover section 40 for closing the base sections 10 can be fitted to the cheeks 20, 30 of the angle accessory to close a portion of each base section 10 and the angle formed between the base sections 10 with no gap or visible edge or crease in the angle (see FIGS. 11, 12 and 14).

As shown in the figures, the means for fitting each length of cover section provided on the bands 24, 34 of the cheeks 20, 30 are advantageously substantially identical to the means for fitting a length of cover section 40 provided on the rims 14, 15 of the lateral flanges 12, 13 of the base sections 10.

To be more specific, each band 24, 34 of each cheek 20, 30 includes engagement means 24A, 34A for engaging the length of cover section 40. The engagement means of each cheek 20, 30 include a groove 24A, 34A that establishes a continuous groove between the grooves 14A, 15A on the rims 14, 15 of the lateral flanges 12, 13 of the base sections 10.

Furthermore, each band 24, 34 of each cheek 20, 30 includes clipping means 24B, 34B for clipping on the length of cover section 40.

The clipping means of each cheek 20, 30 include a clipping bead 24B (see FIG. 3B), 34B which provides a continuous clipping bead between the clipping beads 14B (see FIG. 10), 15B on the rims 14, 15 of the lateral flanges 12, 13 of the butt-jointed base sections 10.

Figure 15:
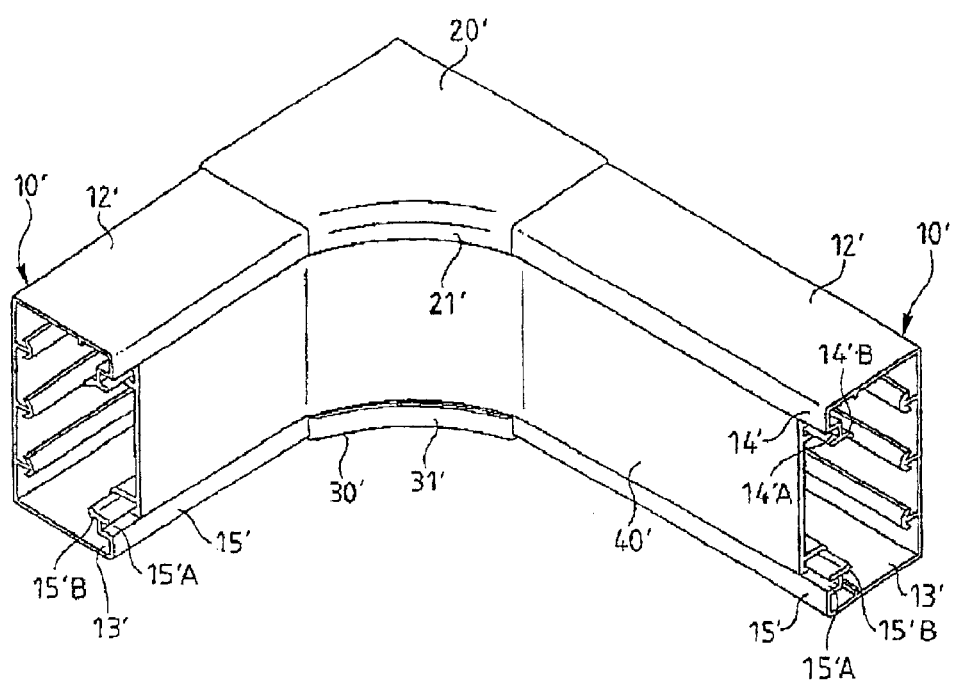
FIG. 15 shows another embodiment of an angle accessory according to the invention for interconnecting base sections of two lengths of trunking positioned to form an internal angle of approximately 90°.

The engagement means 24A, 34A and the clipping means 24B, 34B extend along a circular arc whose radius of curvature is from 35 mm to 80 mm if the cheeks 20, 30 enable an external angle to be formed between the base sections 10 of the lengths of trunking (see FIGS. 1, 10, 11, 12, 13 and 14) and from 35 mm to 40 mm if the cheeks 20', 30' enable an internal angle to be formed between the base sections 10' of the lengths of trunking (see FIG. 15).

Figure 2:
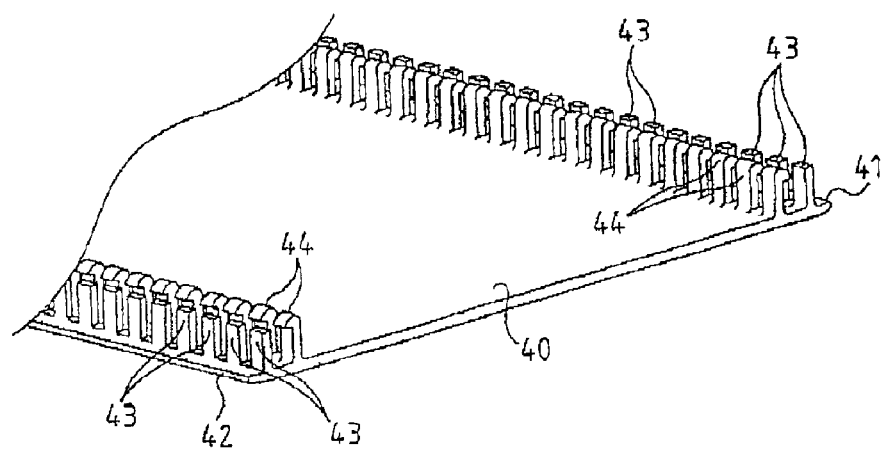
FIG. 2 is a partial bottom view of a length of cover section for closing the base sections shown in FIG. 1.

Accordingly, the series of engagement tongues 43 carried by the length of cover section 40 shown in FIG. 2 are adapted to engage in the grooves 14A, 15A formed at the edges of the rims 14, 15 of the lateral flanges 12, 13 of the butt-jointed base sections 10 and also in the grooves 24A, 34A formed in the bands 24, 34 of the cheeks 20, 30 of the angle accessory attached between the base sections 10.

In the same manner, the series of clipping tongues 44 carried by the length of cover section 40 are adapted to clip over the clipping beads 14B, 15B on the rims 14, 15 of the butt-jointed base sections 10 and over the clipping beads 24B, 34B on the bands 24, 34 of the cheeks 20, 30 of the angle accessory attached between the base sections, so that the same length of cover section 40 closes a portion of each base section 10 and the angle formed between the base sections 10, as shown in FIGS. 11, 12 and 14 in particular.

Of course, in a different embodiment of an angle accessory according to the invention, not shown, the strips of the cheeks can include means for fitting the length of cover section comprising only the engagement means previously cited or only the clipping means previously cited.

Figure 13:
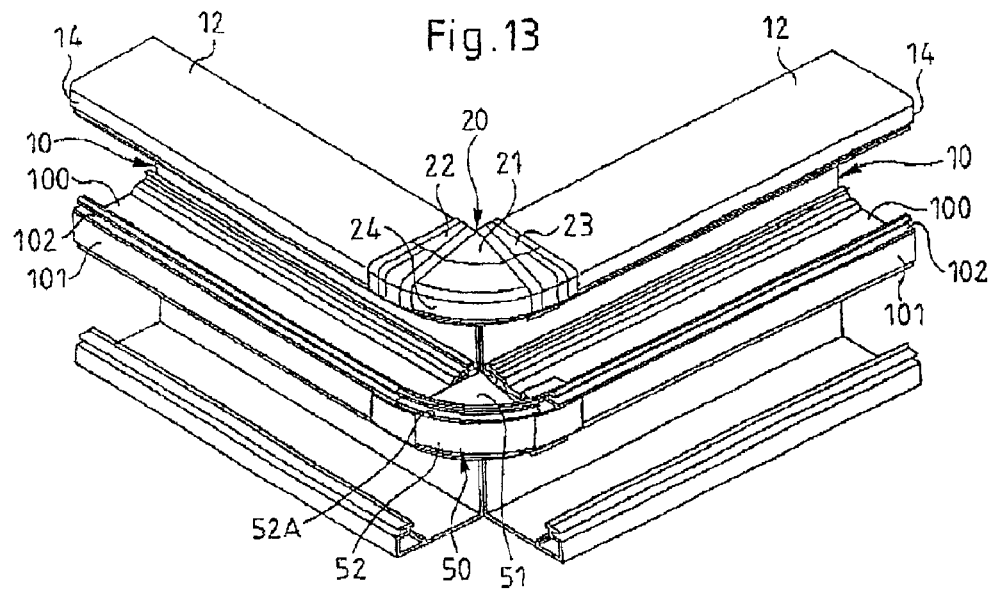
FIG. 13 shows a different embodiment of an angle accessory according to the invention including another cheek for establishing a continuous wall between dividing partitions attached to the backs of butt-jointed lengths of trunking.

As shown in FIG. 13 in particular, in a variant of the angle accessory shown in FIG. 1, the accessory further includes another cheek 50 adapted to establish a continuous wall between two dividing partitions 100 attached to the backs of the butt-jointed base sections 10.

To this end, as shown in FIG. 1 in particular, each back 11 of each base section 10 includes longitudinal ribs 16 for clipping on a dividing partition 100 of the type shown in FIG. 13.

The other cheek 50 also carries a band 52 establishing a continuous wall between the rims 101 of the dividing partitions 100, on which lengths of cover section (not shown) for closing the compartments of the base sections 10 are fitted.

In the same way as on the cheeks 20, 30 of the angle accessory, the band 52 on the other cheek 50 includes means for fitting lengths of cover section that extend along a given radius of curvature that varies between the values previously given, so that a single length of cover section adapted to close the compartments of the base sections 10 can be fitted to the cheeks 20, 50 and 30 of the angle accessory to close a portion of each pair of butt-jointed compartments of the base sections 10 and the angle formed between the base sections 10 with no gap or visible edge or crease in the angle.

The cheeks 20, 30 and 50 advantageously extend the compartments of the base sections 10 in the angle formed between the latter.

Furthermore, thanks to the angle accessory according to the invention shown in FIG. 13, after the butt-jointed base sections 10 have been closed a user can open one of the compartments to obtain access thereto without opening the other one, since each compartment is closed individually.

The other cheek 50 includes a plate 51 establishing a continuous wall between the dividing partitions 100 carried by the backs of the base sections 10.

The means on the band 52 of the other cheek 50 for fitting the length of cover section are identical to those on the rims 101 of the dividing partitions 100. They include an engagement groove 52A establishing a continuous groove between the grooves 102 at the edges of the rims 101 of the dividing partitions 100.

Additionally, the fitting means on the band 52 of the other cheek 50 can also include a clipping bead, not shown, for engaging and clipping the length of closure cover section concerned.

Figure 4A:
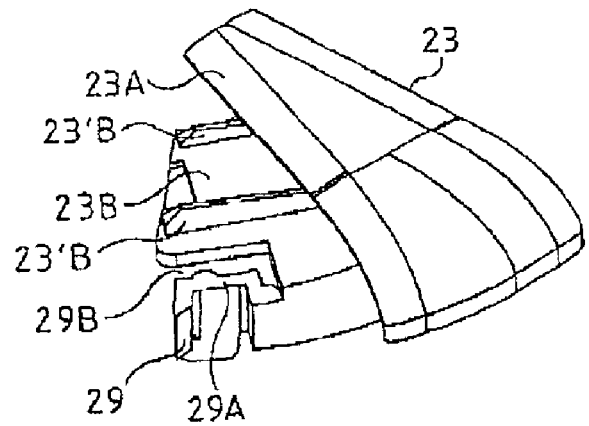
FIG. 4A is a top view of the end member of one cheek of the angle accessory shown in FIG. 1.
Figure 4B:
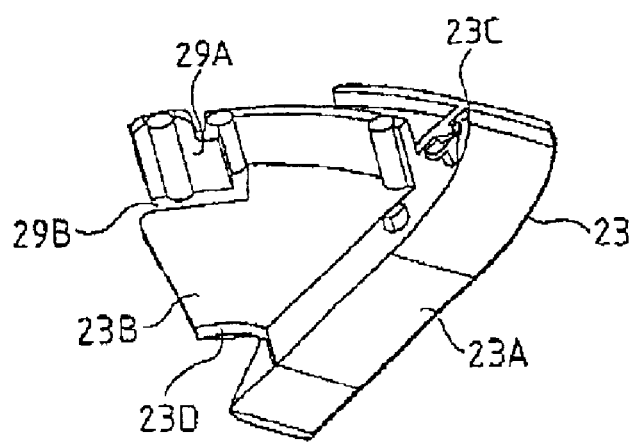
FIG. 4B is a bottom view of the end member shown in FIG. 4A.
Figure 5A:
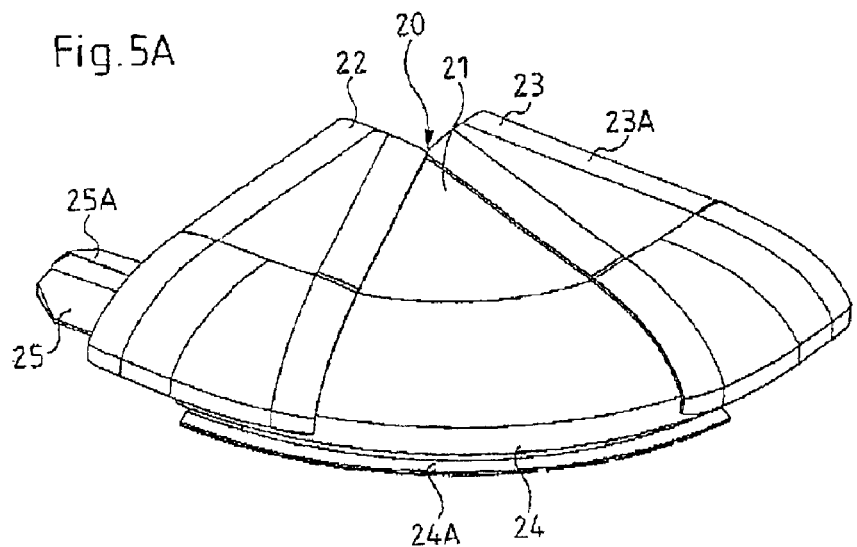
FIG. 5A is a top perspective view of one cheek of the angle accessory shown in FIG. 1.

As shown in FIGS. 3A to 5B in particular, each cheek 20, 30, 50 of the angle accessory shown in FIG. 1 and of the angle accessory shown in FIG. 13, and in particular the cheek 20 shown in FIG. 5A, includes at least two members, namely a base member 21, 22, having an end part 22 adapted to engage over a lateral flange 12 of one of the base sections 10 to cover the cut edge thereof and a central part 21 for establishing a continuous wall between the two lateral flanges 12 of the base sections 10, and an end member 23 attached to the central part 21 of the base member and adapted to engage over a lateral flange 12 of the other base section 10 to cover the cut edge thereof.

Of course, in the case of the other cheek 50, the end part of its base member is adapted to engage over a dividing partition of one of the base sections and its end member is adapted to engage over a dividing partition of the other base section.

The central part 21 of the base member forms an angular sector, the end part 22 of the base member forms another angular sector, and the end member 23 also forms an angular sector, identical to that formed by the end part 22 of the base member.

The end member 23 and the base member 21, 22 can pivot on each other to assume different relative angular positions so that the cheek 20 concerned matches the angle formed between the base sections 10 of the lengths of trunking.

In the example shown in FIG. 5A, the base member 21, 22 and the end member 23 are adapted to assume different relative angular positions to match an angle formed between the base sections 10 from about 90° to about 120°. The cheek 20 shown in FIG. 5A typically matches a 90° external angle formed between the butt-joined base sections 10.

To be more precise, the end member 23 is pivoted to the central part 21 of the base member 21, 22, the central part 21 including the band 24 of the cheek 20.

Figure 5B:
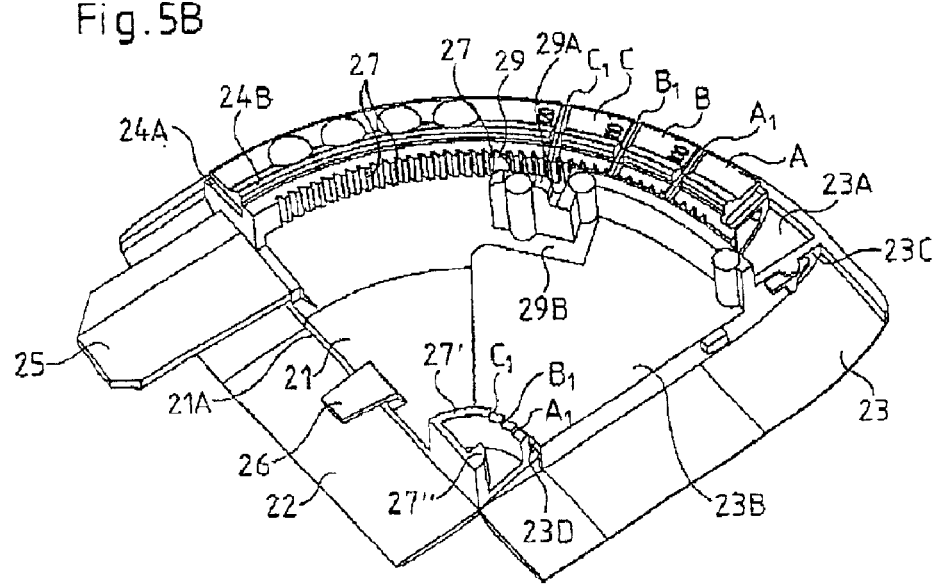
FIG. 5B is a bottom view of the cheek shown in FIG. 5A.

For the end member 23 to pivot on the base member 21, 22, the internal face of the central part 21 of the latter has, near its apex, a first cylindrical surface portion 27' extending over the angular sector formed by the central part 21 and, on the internal side of the end member 23, a complementary second cylindrical surface portion 23D adapted to slide on the first cylindrical surface portion 27' (see FIG. 5B).

Figure 3A:
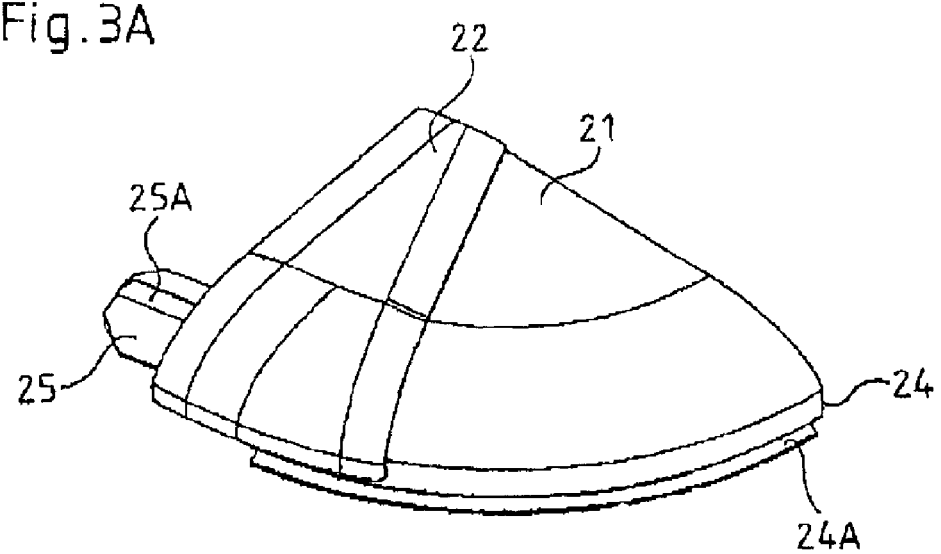
FIG. 3A is a top view of the base member of one cheek of the angle accessory shown in FIG. 1.
Figure 3B:
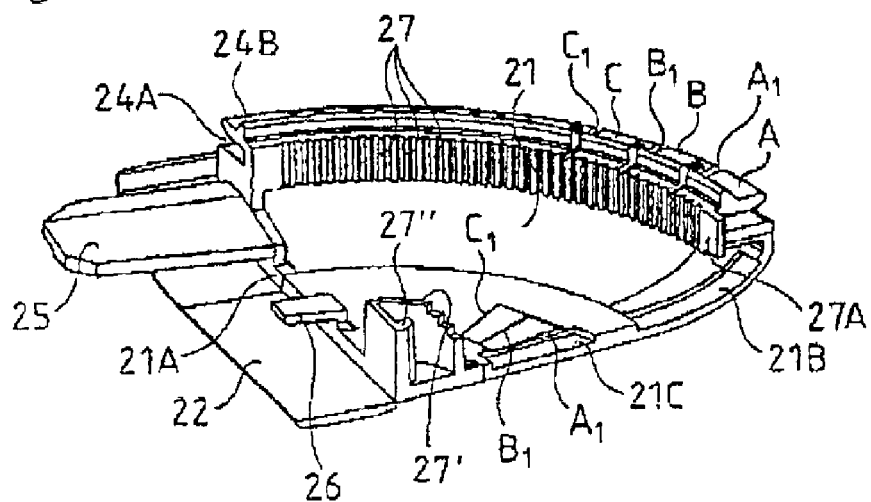
FIG. 3B is a bottom view of the base member shown in FIG. 3A.

Furthermore, as shown in FIGS. 3B, 4B and 5B in particular, releasable immobilizing means cooperating with each other to releasably immobilize the end member 23 and the base member 21, 22 in a relative angular position provided on the base member 21, 22, on the one hand, and on the end member 23, on the other hand.

The releasable immobilizing means on the base member 21, 22 include a series of detents 27 formed on the back of the groove 24A on the band 24 of the central part 21 of the base member and the releasable immobilizing means on the end member 23 include a tooth 29 adapted to bear on one of the detents 27. The tooth 29 is pivoted to the end member 23 so that it can be pivoted to release it from its bearing engagement on one of the detents 27.

This pivoting of the tooth 29 is achieved by means of a flexible tongue 29A, to which the tooth 29 is attached, and which is adapted to flex in a window 29B formed in an internal flange 23B of the end member 23.

Accordingly, to release the immobilizing means, it is sufficient for the user to depress the flexible tongue 29A to cause it to pivot inside the window 29B to disengage the tooth 29 from the detent 27 with which it is cooperating.

Of course, in a variant, not shown, the series of detents could be formed on the end member 23 and the tooth on the base member 21, 22.

Furthermore, as shown in FIGS. 4A, 4B and 5B in particular, the end member 23 includes two flanges, namely an external flange 23A, adapted to cover the outside of the cut edge of the corresponding lateral flange 12 of the base section 10, and an internal flange 23B connected to the external flange 23A by a step 23C, so that the internal and external flanges 23B, 23A assume positions parallel to each other with a gap between them in which is sandwiched a portion of the base member 21, 22, specifically an end portion of the central part 21 of the base member 21, 22.

In the case of the other cheek 50, the external flange of its end member is adapted to cover the cut edge of the corresponding dividing partition 100 of the base section 10.

The external flange 23A of the end member 23 has an external appearance identical to the external appearance of the end part 22 of the base member (see FIG. 5A) so that, when they have been assembled together, the base and end members form a homogeneous whole constituting the cheek 20 concerned.

Furthermore, the internal flange 23B of the end member 23 carries, on a face that faces toward the base member 21, 22, ribs 23'B adapted to bear on the latter. Thanks to these bearing ribs 23'B, the base member 21, 22 is more firmly gripped between the internal and external flanges 23B, 23A of the end member 23.

As shown in FIGS. 3B and 5B in particular, the central part 21 of the base member 21, 22 includes at least one part that can be cut off opposite the end part 22. Here it includes a plurality of parts A, B, C that can be cut off delimited by lines of weakness A1, B1, C1. Each part A, B, C that can be cut off constitutes an angular sector.

The end member 23, and in particular its external flange 23A, covers the cut, if any, made in the central part 21 of the base member 21, 22 along a line of weakness A1, B1 or C1, to improve the overall appearance.

By detaching one of the parts A, B, C that can be cut off from the central part 21 of the base member 21, 22, the user can adapt the cheek 20, consisting in this example of the base member 21, 22 and the end member 23, to different angles between the base sections 10 of lengths of trunking.

In the example shown, by cutting off the part A that can be cut off of the base member 21, 22, the cheek 20 can be adapted to an external angle of approximately 100° by pivoting the base and end members relative to each other. But cutting off the parts A and B of the base member 21, 22, the cheek 20 can be adapted to an angle of approximately 110° by pivoting the base and end members relative to each other.

By cutting off the parts A, B and C, the cheek 20 can be adapted to an external angle of approximately 120°.

As shown in FIG. 5B, the cheek 20 can be adapted to an external angle of approximately 90° by pivoting the end member 23 on the base member 21, 22.

Thanks to the overlapping of the end part 22 and the end member 23, each theoretical angle formed by each cheek has the benefit of a tolerance of ±5°.

At the same end as its end part 22, the base member 21, 22 includes a first tongue 25 which extends from the junction 21A between the end part 22 and the central part 21, facing the internal face of the end part 22 and extending beyond it.

This first tongue 25 is used to attach the end part 22 of the base member 21, 22 to the corresponding lateral flange 12 of the base section 10 concerned by sandwiching a portion of the lateral flange 12 between the first tongue 25 and the end part 22 of the base member 21, 22.

Furthermore, the base member also includes, at the same end as its end part 22, at the junction 21A between the end part 22 and the central part 21, a second tongue 26 facing the internal face of the end part 22, so that a portion of the lateral flange 12 of the base section concerned can be sandwiched between the first and second tongues 25 and 26 and the end part 22 of the base member.

Of course, in the case of the other cheek 50, a portion of the dividing partition 100 is sandwiched between the first and second tongues and the end part of the base member.

To strengthen the retention of the base member 21, 22 on the lateral flange 12 or on the dividing partition 100 to which it is attached, the first tongue 25 includes a rib 25A bearing against the internal face of the lateral flange 12 or the dividing partition 100 concerned.

It will be noted that the second tongue 26 is shorter than the first tongue 25 and that the second tongue 26 therefore does not project beyond the end part 22 of the base member.

It is a simple matter to fit each cheek 20 shown in FIGS. 5A and 5B to the base sections 10 of butt-jointed length of trunking to form an external angle, as shown in FIG. 10, in the following manner.

As shown in FIG. 9, before attaching the cheek 20 to one of the lateral flanges 12 of one of the base sections 10, the user pivots the end member 23 on the base member 21, 22 of the cheek 20 to locate the step 23C on the end member 23 against the end of the groove 24A provided on the band 24 of the cheek 20. The user then engages the end part 22 of the base member 21, 22 over the lateral flange 12 of one of the base sections 10, sandwiching the end part of that lateral flange 12 between the tongues 25 and 26 carried by the end part 22 and the internal face of the latter (see FIG. 10).

The user pivots the end member 23 on the base member 21, 22 of the cheek 20 to locate it in an angular position relative to the latter such that the end member 23 correctly covers the cut edge of the other lateral flange 12 of the other base section 10 in order to establish a continuous sealed wall between the two lateral flanges 12.

Finally, the user closes the two base sections 10 and the angle formed between them with the same length of cover section 40, which is fitted by clipping it onto the rims 14, 15 of the lateral flanges 12, 13 of the base sections 10 and onto the bands of the cheeks 20, 30 of the angle accessory.

The final result obtained is shown in FIG. 12 in particular, which shows two butt-jointed base sections 10 comprising the cheeks 20, 30 of the angle accessory according to the invention and closed by the same length of cover section 40.

If the external angle formed between the base sections 10 of the lengths of trunking is greater than 90°, as is the case in the angle shown in FIG. 12, the user can adapt each cheek 20, 30 of the angle accessory to this new external angle by cutting off one or more parts of the base member 21, 22 that can be cut off and pivoting the end member 23 toward the end part 22 of the base member 21, 22.

As shown in FIGS. 6A, 6B, 7A and 7B, each cheek 20, 30, 50, in this instance more particularly the cheek 20, can include at least one supplementary member 28 to be fixedly attached to the base member 21, 22 opposite its end part 22 to form a single member to which the end member 23 is pivoted.

The supplementary member 28 constitutes an angular sector (see FIG. 6A) and carries a band 28' which constitutes a part of the band of the cheek 20.

Figure 7A:
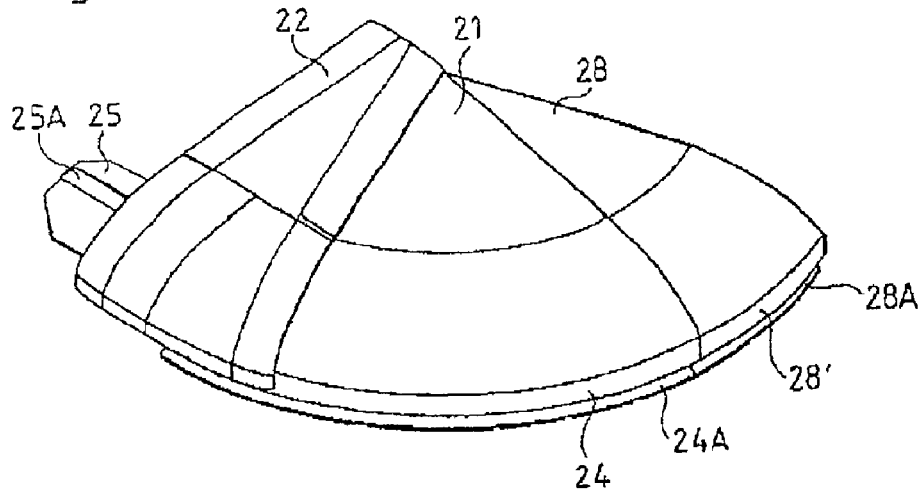
FIG. 7A is a perspective view of the base member assembled to the additional member of one cheek of the angle accessory according to the invention.

The supplementary member 28 is nested over the central part 21 of the base member 21, 22 to assume a position flush with the central part 21 so as to constitute an angular extension thereof (see FIG. 7A).

Accordingly, when the supplementary member 28 is attached to the central part 21 of the base member 21, 22, the bands 24, 28' of the base member 21, 22 and of the supplementary member 28 are butt-jointed to form a single band constituting the band of the cheek 20.

Figure 7B:
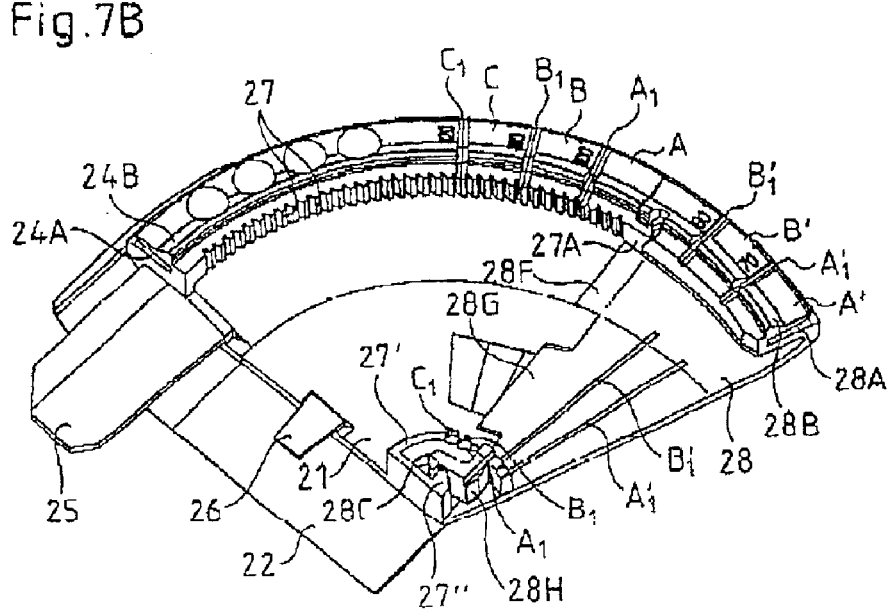
FIG. 7B is a bottom view of the assembly shown in FIG. 7A.

For nesting the supplementary member 28 over the base member 21, 22, notches 21B, 21C are provided on the internal side of the central part 21 of the base member 21, 22, in the vicinity of its end edge, in which tongues 28F, 28G on an end edge of the supplementary member 28 engage (see FIG. 7B).

Furthermore, the supplementary member 28 is hooked onto the base member 21, 22.

For this purpose, the supplementary member 28 includes a hooked tooth 28C at the end of a tongue 28D which is connected in the vicinity of the apex of the supplementary member 28 and, at the opposite end, under the groove 28A formed in the band 28' of the supplementary member 28, a tongue 28E parallel to the longitudinal axis of the groove 28A.

In corresponding relationship, as shown in FIG. 7B in particular, the base member 21, 22 includes, at its apex, a hooked tooth 27" onto which hooks the hooked tooth 28C of the supplementary member 28 and, at the opposite end, a tongue 27A having at its end a tooth adapted to be inserted in a housing provided on the supplementary member 28 behind the tongue 28E.

Accordingly, on assembling the supplementary member 28 to the base member 21, 22, the tongues 28F, 28G nest in the corresponding notches 21B, 21C on the base member, the hooked tooth 28C hooks over the corresponding hooked tooth 27" of the base member 21, 22, and the tongues 28E, 27A assume a position in which they lie against each other, the tooth at the end of the tongue 27A clipping into the housing behind the tongue 28E on the supplementary member 28.

In this way, the supplementary member 28 is rigidly fixed to the base member 21, 22 so that together they constitute a single member (see FIG. 7A) to the end of which the end member 23 previously described can be pivoted.

Figure 8A:
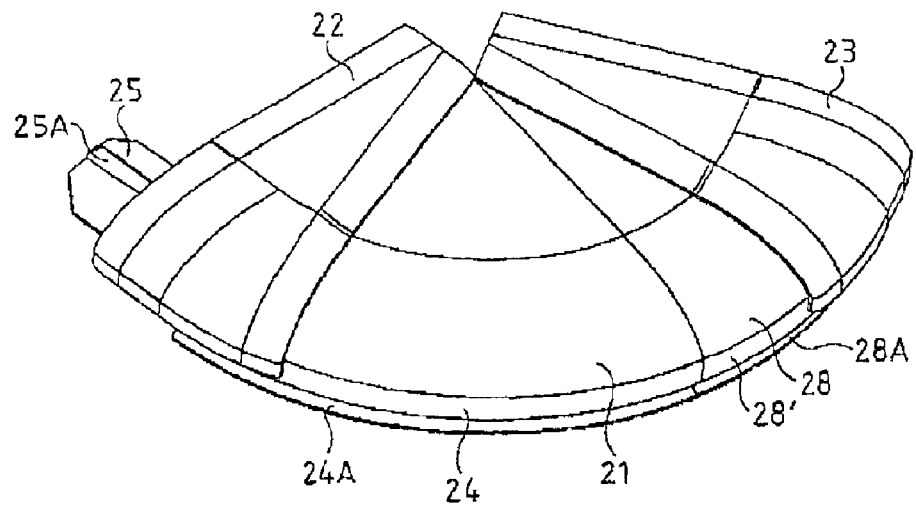
FIG. 8A shows a different embodiment of one cheek of an angle accessory according to the invention, comprising three members, namely a base member, an additional member, and an end member.
Figure 8B:
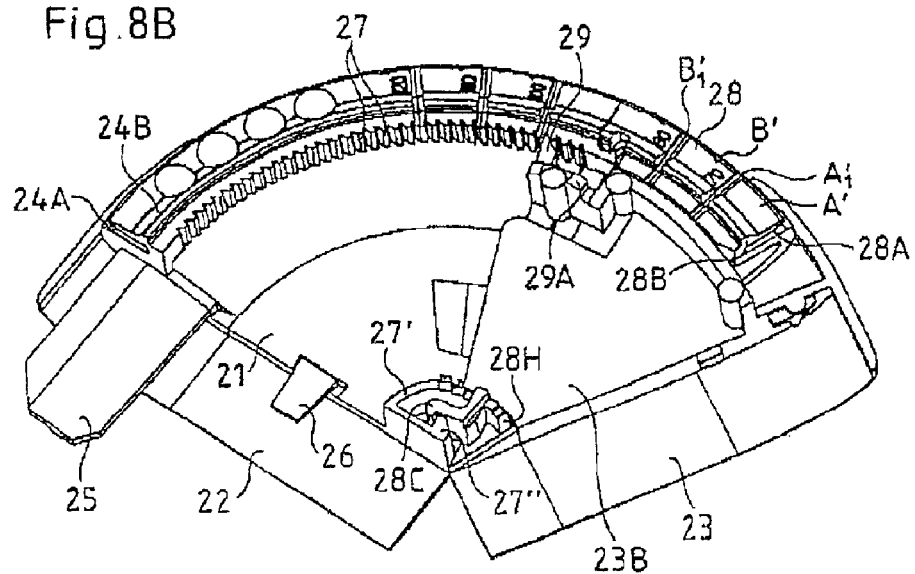
FIG. 8B is a bottom view of the cheek shown in FIG. 8A.

The assembly of the three members is shown in FIGS. 8A and 8B in particular.

To pivot the end member 23 to the supplementary member 28, which constitutes an extension of the central part 21 of the base member 21, 22, the supplementary member 28 has, in the vicinity of its apex, a cylindrical surface portion 28H which extends the cylindrical surface portion 27' of the base member when the supplementary member 28 is assembled to the base member 21, 22.

The cylindrical surface portion 28H receives the complementary cylindrical surface portion 23D on the end member 23, which slides on it.

The means for releasably immobilizing the end member 23 on the base member remain exactly the same, relying on cooperation of the tooth 29 with the detents 27 provided on the base member 21, 22.

Of course, the band 28' of the supplementary member 28 includes a groove 28A extending the groove 24A in the base member and a clipping bead 28B extending the clipping bead 24B of the base member.

Furthermore, the supplementary member 28 includes part A', B' which can be cut off delimited by cutting lines A'1, B'1.

The assembly comprising the base member 21, 22, the supplementary member 28, and the end member 23, enables each cheek 20, 30, 50 of the angle accessory to be adapted to different external angles formed between the base sections 10 of lengths of trunking, from 60° to 80°.

To this end, when the supplementary member 28 is complete, i.e. when none of its parts that can be cut off has been detached, the corresponding cheek formed by the assembly of the three members previously cited and shown in FIG. 8A connects the lateral flanges 12, 13 of the base sections 10 of the lengths of trunking positioned to form between them an external angle of approximately 60°.

To adapt the cheek to base sections 10 forming between them an external angle of approximately 70°, it is sufficient to remove one of the parts of the supplementary member 28 that can be cut off and to pivot the end member to adjust its angular position.

Finally, to adapt the cheek to base sections 10 of lengths of trunking forming between them an external angle of approximately 80°, it is sufficient to detach from the supplementary member 28 the two parts A', B' that can be cut off, to reduce its angular size, and to pivot the end member on the supplementary member to adjust their relative angular position.

The cheek 20 comprising the three members previously cited assembled together is fitted in exactly the same way as the cheek 20 comprising only the base member and the end member, as previously described with reference to FIGS. 9 and 10.

FIG. 14 shows the final result obtained after fitting to the base sections 10 the identical cheeks 20 and 30 each comprising three members, namely the base member 21, 22, the supplementary member 28 and the end member 23, and after closing the resulting assembly with a single length of cover section 40.

In FIG. 14, the base sections 10 of the butt-jointed lengths of trunking form between them an external angle equal to about 60°.

Of course, the other cheek 50, adapted to establish a continuous wall between the dividing partitions 100 attached to the backs of the base sections 10 of the lengths of trunking can, like the cheeks 20 and 30, comprise a plurality of members, in practice similar to those previously described, and in particular a base member, an end member, and a supplementary member, so that the other cheek 50 can also be adapted to different angles from 60° to 120° between the base sections 10 of lengths of trunking.

FIG. 15 shows a variant of the angle accessory according to the invention for connecting base sections 10' of lengths of trunking forming between them an internal angle equal to approximately 90°.

Each base section 10' has a U-section with lateral flanges 12', 13' comprising rims 14', 15' directed toward each other and comprising means for fitting a length of cover section 40' identical to those previously described. The fitting means include engagement means 14'A and 15'A comprising a groove and clipping means 14'B and 15'B comprising a clipping bead running under the corresponding groove 14'A, 15'A.

As shown in FIG. 15, the angle accessory also includes two cheeks 20', 30' adapted to establish a continuous wall between the lateral flanges 12', 13' of the butt-jointed base sections 10'.

Each cheek 20', 30' has a right-angle profile and includes, opposite the right angle formed by its end edges, a strip 21', 31' adapted to establish a continuous wall between the rims 14', 15' of the lateral flanges 12', 13' of the butt-jointed base sections 10'.

Each band 21', 31' of each cheek 20', 30' of the angle accessory according to the invention also includes means for fitting the length of cover section 40' so that a part of the base sections 10' and the angle formed between them can be closed by the same length of cover section 40' with no gap or visible edge or crease in the angle, as shown in FIG. 15.

Once again, the fitting means on the bands 21', 31' of the cheeks 20', 30' are practically identical to those on the rims 14', 15' of the lateral flanges 12', 13' of the corresponding base sections 10' and are not described in detail.

Finally, another cheek similar to the cheeks 20', 30' can be provided to establish, in the situation of forming an internal angle between the two base sections 10', a continuous wall between dividing partitions attached to the backs of the base sections 10'.

Of course, the various cheeks 20, 30, 50, 20', 30' of the angle accessory according to the invention are made of the same material as the base sections of the lengths of trunking.

The present invention is in no way limited to the embodiments described and shown, many variants of which conforming to the spirit of the invention will be evident to the person skilled in the art.

What is claimed is:

1. A trunking angle accessory for establishing continuity between two differently oriented lengths of trunking each including a base section having two lateral flanges with rims directed toward each other and having means for mounting a length of cover section, said angle accessory comprising:

two cheeks, each cheek adapted to establish continuity between two lateral flanges of said two base sections, each cheek carrying a strip for establishing continuity between said rims of said two lateral flanges of said two base sections, wherein said strip of each cheek includes means for mounting a length of cover section, the means for mounting extending along a circular arc of given radius of curvature, whereby a single length of said cover section, adapted to close said base sections, can be mounted on said cheeks and said lateral flanges to close portions of said base sections and the angle formed between said base sections.

2. The angle accessory claimed in claim 1, further including another cheek adapted to establish continuity between two divider partitions attached to backs of said two base sections and carrying a strip for establishing continuity between rims of said divider partitions for mounting lengths of cover section for closing compartments of said base sections, said strip including means for mounting lengths of cover section extending along a given radius of curvature, so that single lengths of cover section adapted to close pairs of said compartments of said base sections can be mounted on said cheeks and said lateral flanges to close portions of pairs of compartments of said base sections and the angle formed between said base sections.

3. The angle accessory claimed in claim 1 wherein said means for mounting a length of cover section on said strips of said cheeks are substantially identical to said means for mounting a length of cover section on said rims of said lateral flanges of said base sections.

4. The angle accessory claimed in claim 2 wherein said means for mounting a length of cover section on said strips of said cheeks are substantially identical to said means for mounting a length of cover section on said rims of said divider partitions of said base sections.

5. The angle accessory claimed in claim 1 wherein said means for mounting a length of cover section on said strips of said cheeks include engagement means for engaging said length of cover section.

6. The angle accessory claimed in claim 2 wherein said means for mounting a length of cover section on said strips of said cheeks include engagement means for engaging said length of cover section.

7. The angle accessory claimed in claim 5 wherein said engagement means of each cheek include a groove adapted to establish continuity between grooves on said rims of said lateral flanges of said base sections.

8. The angle accessory claimed in claim 6 wherein said engagement means of each cheek include a groove adapted to establish continuity between grooves on said rims of said divider partitions of said base sections.

9. The angle accessory claimed in claim 1 wherein said means on said strips of said cheeks for mounting a length of cover section include clipping means for clipping a length of cover section.

10. The angle accessory claimed in claim 2 wherein said means on said strips of said cheeks for mounting a length of cover section include clipping means for clipping a length of cover section.

11. The angle accessory claimed in claim 9 wherein said clipping means of each cheek include a clipping bead adapted to establish continuity between said clipping beads provided on said rims of said lateral flanges of said base sections.

12. The angle accessory claimed in claim 10 wherein said clipping means of each cheek include a clipping bead adapted to establish continuity between said clipping beads provided on said rims of said divider partitions of said base sections.

13. The angle accessory claimed in claim 1 wherein said radius of curvature is from approximately 35 mm to approximately 80 mm.

14. The angle accessory claimed in claim 2 wherein said radius of curvature is from approximately 35 mm to approximately 80 mm.

15. The angle accessory claimed in claim 13 wherein said radius of curvature is from approximately 35 mm to approximately 40 mm.

16. The angle accessory claimed in claim 14 wherein said radius of curvature is from approximately 35 mm to approximately 40 mm.

17. The angle accessory claimed in claim 1 wherein each cheek includes a base member having an end part adapted to engage over a lateral flange of one of said base sections to cover its cut edge and an end member adapted to engage over a lateral flange of the other of said base sections to cover its cut edge, said end member and said base member being adapted to pivot on each other so that they can be placed in different relative angular positions.

18. The angle accessory claimed in claim 2 wherein each cheek includes a base member having an end part adapted to engage over a divider partition of one of said base sections to cover its cut edge and an end member adapted to engage over a divider partition of the other of said base sections to cover its cut edge, said end member and said base member being adapted to pivot on each other so that they can be placed in different relative angular positions.

19. The angle accessory claimed in claim 17 wherein releasable immobilizing means on said base member and on said end member cooperate with each other to immobilize said end member and said base member in an angular position relative to each other in a releasable manner.

20. The angle accessory claimed in claim 18 wherein releasable immobilizing means on said base member and on said end member cooperate with each other to immobilize said end member and said base member in an angular position relative to each other in a releasable manner.

21. The angle accessory claimed in claim 19 wherein said releasable immobilizing means include, on one of said base and end members, a series of detents and, on the other of said base and end members, a tooth adapted to bear on one of said detents, said tooth being pivoted to the member concerned so that it can be pivoted to release it from its bearing engagement with said detent.

22. The angle accessory claimed in claim 20 wherein said releasable immobilizing means include, on one of said base and end members, a series of detents and, on the other of said base and end members, a tooth adapted to bear on one of said detents, said tooth being pivoted to the member concerned so that it can be pivoted to release it from its bearing engagement with said detent.

23. The angle accessory claimed in claim 17 wherein one of said base and end members has a first cylindrical surface portion extending over a particular angular sector and the other of said base and end members has a complementary second cylindrical surface portion adapted to slide on said first cylindrical surface portion to effect the pivoting of said base and end members on each other.

24. The angle accessory claimed in claim 18 wherein one of said base and end members has a first cylindrical surface portion extending over a particular angular sector and the other of said base and end members has a complementary second cylindrical surface portion adapted to slide on said first cylindrical surface portion to effect the pivoting of said base and end members on each other.

25. The angle accessory claimed in claim 17 wherein said end member has an external flange adapted to cover the cut edge of the corresponding lateral flange of said base section and an internal flange and a portion of said base member can be sandwiched between said external flange and said internal flange.

26. The angle accessory claimed in claim 18 wherein said end member has an external flange adapted to cover the cut edge of the corresponding dividing partition of said base section and an internal flange and a portion of said base member can be sandwiched between said external flange and said internal flange.

27. The angle accessory claimed in claim 25 wherein said external flange of said end member has an external appearance identical to the external appearance of said end part of said base member.

28. The angle accessory claimed in claim 25 wherein a face of said internal flange of said end member that faces toward said base member carries ribs adapted to bear on said base member.

29. The angle accessory claimed in claim 17 wherein said base member has at least one part that can be cut off opposite its end part.

30. The angle accessory claimed in claim 18 is wherein said base member has at least one part that can be cut off opposite its end part.

31. The angle accessory claimed in claim 29 wherein each part that can be cut off constitutes an angular sector.

32. The angle accessory claimed in claim 30 wherein each part that can be cut off constitutes an angular sector.

33. The angle accessory claimed in claim 17 wherein said base member has, at the same end as its end part, a first tongue facing the internal face of said end part, and a portion of the corresponding lateral flange of the base section concerned can be sandwiched between said first tongue and said end part of said base member.

34. The angle accessory claimed in claim 18 wherein said base member has, at the same end as its end part, a first tongue facing the internal face of said end part, and a portion of the corresponding divider partition of the base section concerned can be sandwiched between said first tongue and said end part of said base member.

35. The angle accessory claimed in claim 33 wherein said first tongue extends beyond said end part of said base member.

36. The angle accessory claimed in claim 34 wherein said first tongue extends beyond said end part of said base member.

37. The angle accessory claimed in claim 33 wherein a face of said first tongue facing toward said end part carries a rib adapted to bear on the internal face of said lateral flange concerned.

38. The angle accessory claimed in claim 34 wherein a face of said first tongue facing toward said end part carries a rib adapted to bear on the internal face of the divider partition concerned.

39. The angle accessory claimed in claim 33 wherein said base member includes, at the same end as its end part, a second tongue facing the internal face of said end part, and a part of the corresponding lateral wall of the base section concerned can be sandwiched between said first and second tongues and said end part of said basic member.

40. The angle accessory claimed in claim 34 wherein said base member includes, at the same end as its end part, a second tongue facing the internal face of said end part, and a part of the corresponding divider partition of the base section concerned can be sandwiched between said first and second tongues and said end part of said basic member.

41. The angle accessory claimed in claim 17 wherein said base member has a central part to which said end member is pivoted and said central part includes said strip of said cheek.

42. The angle accessory claimed in claim 18 wherein said base member has a central part to which said end member is pivoted and said central part includes said strip of said cheek.

43. The angle accessory claimed in claim 17 wherein each cheek includes a supplementary member adapted to be fixedly attached to said base member opposite its end part to form a single member to which said end member is pivoted.

44. The angle accessory claimed in claim 18 wherein each cheek includes a supplementary member adapted to be fixedly attached to said base member opposite its end part to form a single member to which said end member is pivoted.

45. The angle accessory claimed in claim 43 wherein each additional member is nested over said base member.

46. The angle accessory claimed in claim 44 wherein each additional member is nested over said base member.

47. The angle accessory claimed in claim 43 wherein each supplementary member is hooked onto said base member.

48. The angle accessory claimed in claim 44 wherein each supplementary member is hooked onto said base member.

49. The angle accessory claimed in claim 43 wherein each supplementary member includes a part which can be cut off extending over an angular sector.

50. The angle accessory claimed in claim 44 wherein each supplementary member includes a part which can be cut off extending over an angular sector.

51. The angle accessory claimed in claim 43 wherein each supplementary member includes a part of said strip of said cheek.

52. The angle accessory claimed in claim 44 wherein each supplementary member includes a part of said strip of said cheek.

53. Trunking assembly comprising:
two lengths of trunking adapted to be oriented at an angle relative to each other,
each of the lengths of trunking including a base section having lateral flanges with rims directed toward each other and having means for mounting a length of cover section,
an angle accessory adapted to be located between the lengths and comprising two cheeks for establishing continuity between two lateral flanges of the two base sections,
each of said cheeks carrying a strip for establishing continuity between said rims of said two lateral flanges of said two base sections,
the strip of each of said cheeks including means for mounting a length of cover section, the means for mounting extending along a circular arc of a given radius of curvature, and
a single length of cover section cooperable with the means for mounting a length of cover section on the rims of the base sections and with the means for mounting a length of cover section on the strips of the cheeks whereby said single length of cover section is adapted to close portions of the base sections of the two lengths of trunking and to extend along the circular arc of given radius of curvature of the angle accessory.

54. The trunking assembly claimed in claim 53, wherein said single length closes the portion of the base sections with no gap or visible edge or crease at or proximate to the angle accessory.

55. The trunking assembly claimed in claim 54, further including another cheek adapted to establish continuity between two divider partitions attached to backs of said two base sections and carrying a strip for establishing continuity between rims of said divider partitions for mounting lengths of cover section for closing compartments of said base sections, said strip including means for mounting lengths of cover section extending along a given radius of curvature, single lengths of cover section cooperable with the means for mounting a length of cover section on the rims of the base sections and with the means for mounting a length of cover section on the strips of the cheeks so that single lengths of cover section are adapted to close respective pairs of said compartments of said base sections and to extend along the circular arc of given radius curvature of the angle accessory.

56. The trunking assembly claimed in claim 55, wherein said single length closes the portion of the base sections with no gap or visible edge or crease at or proximate to the angle accessory.

57. The trunking assembly claimed in claim 54 wherein said means for mounting a length of cover section on said strips of said cheeks are substantially identical to said means for mounting a length of cover section on said rims of said lateral flanges of said base sections.

58. The trunking assembly claimed in claim 55 wherein said means for mounting a length of cover section on said strips of said cheeks are substantially identical to said means for mounting length of cover section on said rims of said divider partitions of said base sections.

59. The trunking assembly claimed in claim 54 wherein said means for mounting a length of cover section on said strips of said cheeks include engagement means for engaging said length of cover section.

60. The trunking assembly claimed in claim 55 wherein said means for mounting a length of cover section on said strips of said cheeks include engagement means for engaging said length of cover section.

61. The trunking assembly claimed in claim 58 wherein said engagement means of each cheek include a groove adapted to establish continuity between grooves on said rims of said lateral flanges of said base sections.

62. The trunking assembly claimed in claim 59 wherein said engagement means of each cheek include a groove adapted to establish continuity between grooves on said rims of said divider partitions of said base sections.

63. The trunking assembly claimed in claim 60 wherein said means on said strips of said cheeks for fitting a length of cover section include clipping means for clipping a length of cover section.

64. The trunking assembly accessory claimed in claim 55 wherein said means on said strips of said cheeks for mounting a length of cover section include clipping means for clipping a length of cover section.

65. The trunking assembly claimed in claim 62 wherein said clipping means of each cheek include a clipping bead adapted to establish continuity between said clipping beads provided on said rims of said lateral flanges of said base sections.

66. The trunking assembly claimed in claim 63 wherein said clipping means of each cheek include a clipping bead adapted to establish continuity between said clipping beads provided on said rims of said divider partitions of said base sections.

* * * * *